May 4, 1965     S. L. BLAYLOCK, JR., ET AL     3,182,103
PROCESS AND APPARATUS FOR TREATING
HOLLOW THERMOPLASTIC ARTICLES
Filed Nov. 20, 1961     2 Sheets-Sheet 1
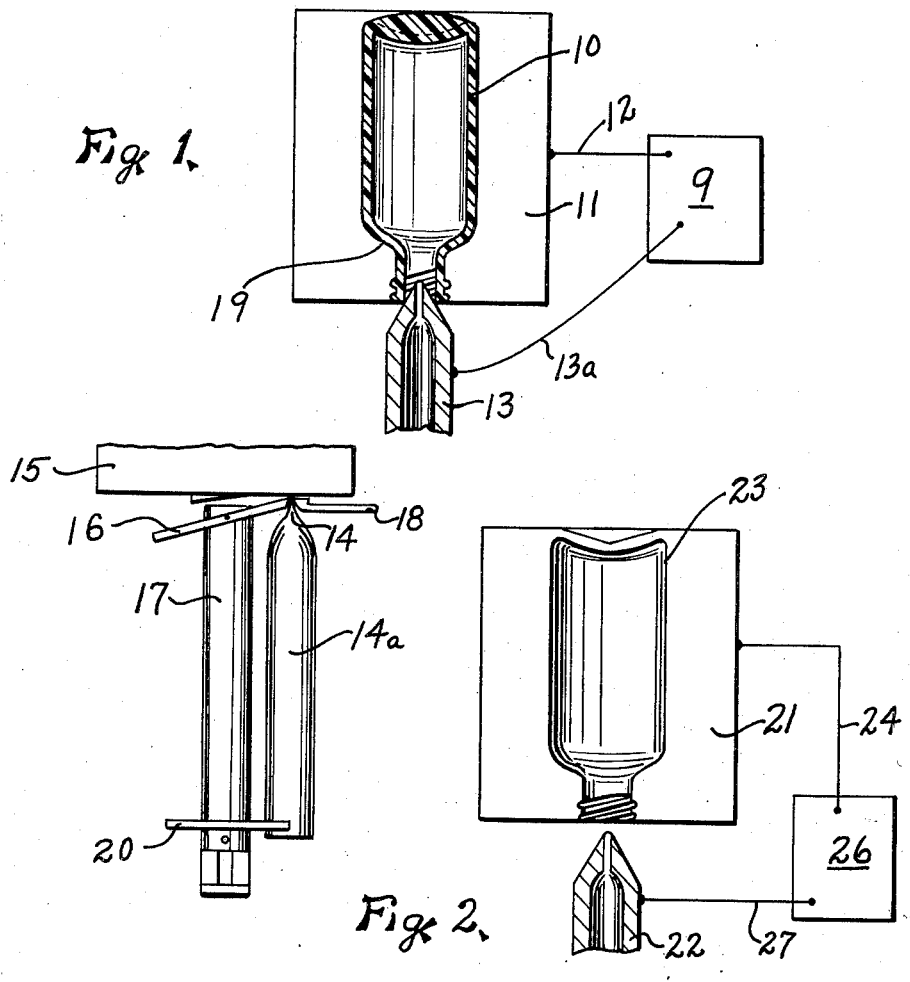
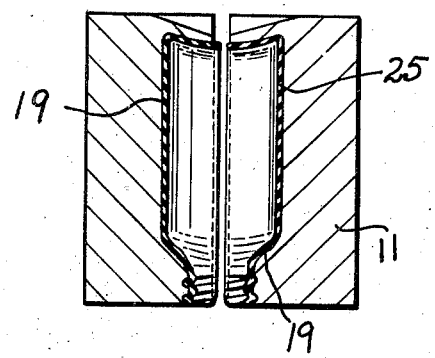
INVENTORS
SPENCER L. BLAYLOCK, JR.
and
WILBUR A. SCHAICH May 4, 1965 S. L. BLAYLOCK, JR., ET AL 3,182,103
PROCESS AND APPARATUS FOR TREATING
HOLLOW THERMOPLASTIC ARTICLES
Filed Nov. 20, 1961 2 Sheets-Sheet 2

INVENTOR.
SPENCER L. BLAYLOCK Jr.
and
BY WILBUR A. SCHAICH

United States Patent Office 3,182,103
Patented May 4, 1965

3,182,103
PROCESS AND APPARATUS FOR TREATING HOLLOW THERMOPLASTIC ARTICLES
Spencer L. Blaylock, Jr., Toledo, and Wilbur A. Schaich, Maumee, Ohio, assignors to Owens-Illinois Glass Company, a corporation of Ohio
Filed Nov. 20, 1961, Ser. No. 153,622
12 Claims. (Cl. 264—22)

This application is a continuation-in-part of our co-pending application Serial No. 63,028 and filed October 17, 1960, now abandoned.

This invention relates generally to a process and apparatus for treating hollow thermoplastic articles and more particularly to a process and apparatus for treating a surface of a hollow thermoplastic article for the reception of a surface coating.

In the prior art, hollow thermoplastic articles were subjected to chemical treatments, heat treatments or the direct application of flame to improve their reception of protective or decorative coatings, inks, adhesives and the like. These methods accomplish the desired result by improving the adhesion of such coatings, however, they require expensive modifications in existing equipment. For instance, in the flame treating process the hollow article must be passed through a ring of flame if the entire exterior surface is to be treated. This requires adidtional conveyors, burners, source of fuel, controls for the flame, etc. all of which add materially to the cost of the production apparatus.

It has also been suggested that the adhesive properties of the surfaces of thermoplastic articles may be improved by subjecting the same to a corona discharge. This method requires that the surface to be treated be uniformly disposed between two electrodes used to produce the discharge, hence the electrodes must conform to the shape of the article to be treated. Thus it can be seen that such a method is severely limited in its application to hollow plastic articles because it is possible to treat only tubular or wide-mouth articles which permit an electrode corresponding to the shape of the article to be inserted through the mouth thereof.

It is therefore an object of the present invention to provide an improved process and apparatus for treating the surfaces of hollow thermoplastic articles for the reception of a surface coating. It is another object of the present invention to provide a process for forming and treating a hollow thermoplastic article wherein a hollow parison of thermoplastic material is formed and during expansion to the walls of a blow mold is subjected to treatment to render the exterior surface of the resulting article receptive to a surface coating.

It is a further object of the present invention to provide a process and apparatus for concurrently forming a hollow thermoplastic article and electrostatically treating the same for the reception of a surface coating.

A further object of this invention is to provide a process and apparatus for electrostatically treating the surfaces of a hollow thermoplastic article for the reception of a surface coating which provides uniform treatment irrespective of the shape of the article or of the surface to be treated.

Another object of the present invention is to provide a process and apparatus for concurrently forming a hollow thermoplastic article and electrostatically treating the surfaces of the same for the reception of a surface coating which require only minor modifications in existing forming equipment.

A further object of this invention is to provide a process and apparatus for electrostatically printing on a formed thermoplastic article.

Still another object of the present invention is to provide a process and apparatus for concurrently forming a thermoplastic article and electrostatically treating the surfaces of the same followed by electrostatically printing on the formed thermoplastic article with utilization of part of the apparatus used in the forming and electrostatically treating method.

Still another object of the present invention is to provide a process and apparatus for electrostatically treating the surface of an extruded thin-walled tube of plastic material to improve its receptivity to a surface coating.

A further object of this invention is to provide a process and apparatus for concurrently forming an extruded thin-walled tubing of material and electrostatically treating the surfaces of the same for the reception of a surface coating.

These and other objects will become apparent from a reading of the following detailed description taken in conjunction with the accompanying drawing, in which:

FIGURE 1 is an elevational view partly in cross section of an apparatus embodying this invention for electrostatically treating a hollow thermoplastic article;

FIGURE 2 is a diagrammatic elevational view partly in cross section of an apparatus embodying this invention for concurrently forming a thermoplastic article and electrostatically treating the surfaces of the same;

FIGURE 3 is a sectional view of a mold containing a dielectric film;

Figure 4:
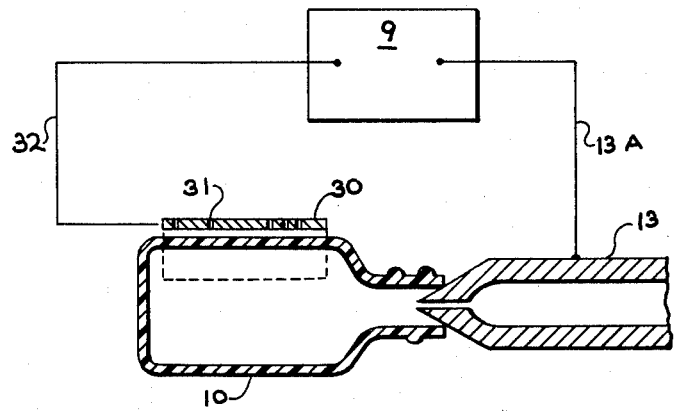
FIGURE 4 is an elevational view partly in cross section of an apparatus embodying this invention for electrostatic printing on a thermoplastic container.

In brief, the foregoing objects of this invention may be accomplished by disposing adjacent the exterior surface of a hollow thermoplastic article an electrically conducting element which has an inner surface complementary to the article surface which is to be treated. An electrically conducting fluid is introduced into the article to function as an electrode and an electric potential is imposed between the element and the fluid which produces an electrostatic discharge through the article surface which is to be treated. Alternatively the objects of this invention may be accomplished by forming a hollow parison of a thermoplastic material. This parison is placed in an electrically conducting mold and expanded to the walls of the mold by an electrically conducting fluid under pressure. An electric potential is imposed between the mold and fluid to produce an electrostatic discharge through the surface of the article which is to be treated.

It has been suggested that the electrostatic discharge alters the molecular structure of the surface of a thermoplastic article with the result that the adhesion of coatings, decorative matter, etc. is greatly improved. Another suggests that the discharge oxidizes the surface molecules. It has also been suggested that the discharge unsaturates the surface molecules of the thermoplastic article. This invention is not to be limited to any expressed theory of the chemical or physical changes that may occur.

The above described process makes it possible to economically and effectively treat the surface of any hollow thermoplastic article irrespective of the shape of the surface or of the article. It is also possible to treat the hollow article and concurrently form the same.

Referring now to the drawings and in particular to FIGURE 1, a hollow thermoplastic article 10 formed by any conventional process is fixedly positioned by any suitable means (not shown). An electrically conducting element 11 whose inner surfaces 19 corresponds to at least a portion of the exterior surface of the article 10 is then positioned adjacent article 10. Element 11 is formed from any electrically conducting material as for example iron, steel, copper, aluminum or alloys thereof and is connected to a source 9 of electrical energy by way of wire 12. An electrically conducting fluid from a suitable source (not shown) is introduced into the interior of container 10 through an electrically conducting nozzle 13 to completely fill the interior of article 10. Nozzle 13 is connected by lead 13a to the other terminal of the electrical energy source 9. The source 9 of electrical energy is activated to impose an electric potential between the element 11 and the electrically conducting fluid thereby producing an electrostatic discharge through the surface of the article 10.

The inner surface 19 of the element 11 can assume any configuration provided it corresponds to the shape of the surface of the hollow article that is to be treated. For instance, it may assume the shape of the entire article or only a portion thereof depending upon whether the entire article or only a portion of the surface is to be treated. If the entire exterior or interior surface of the article or a portion of the surface of the article completely encircling the article is to be treated, the element 11 will be connected to the source of electrical energy by wire 12 and completely enclose or encircle the article 10. This will make it possible to produce an electrostatic discharge through the entire surface or at least completely around the article 10. Element 11 may be further insulated from the electrically conducting fluid by way of a dielectric film 25 covering the interior surface 19 of element 11 as is more clearly shown in FIGURE 3. Preferably the electrically conducting fluid will be grounded, however, it is not essential that the same be grounded.

The effect of the electrostatic treatment may be found on both the exterior and interior surfaces of the article 10. It is therefore possible to improve the adhesion of the exterior surface to decorative or protective coatings, inks, etc. and at the same time to improve the adhesion of the interior surface of the article 10 to the reception of protective coatings, other thermoplastics, etc.

Referring now to FIGURE 2 and an alternative process and apparatus illustrated therein, a hollow thermoplastic tubing 14 is supplied downwardly by extrusion through a die 15. As soon as the desired length of tubing has been extruded the same is cut by a shear blade 16 mounted on carrier 17 to form a parison 14a. The shear blade 16 operates by direct contact with the orifice (not shown) of the die 15. When the parison 14a is sheared by the blade it is pinched between the blade and guiding arm 18 positioned adjacent the orifice.

A carrier 17 with lower guide arm 20 moves away from the die 15 and positions the parison 14a between two sections of a partible mold 21. The mold cavity 23 is of a configuration which corresponds to the desired final shape of a hollow thermoplastic article which is to be formed. Either before or after closing of the mold sections, an electrically conducting blowhead 22 is brought into engagement with the lower open end of the tubing.

The mold 21 is formed of electrically conducting materials such as those described above and is insulated from the remainder of the forming machine (not shown). A source 26 of electrical energy is connected to mold 21 by way of wire 24 or other suitable means and to blowhead 22 by way of wire 27. An electrically conducting fluid under pressure is introduced into parison 14a by way of blowhead 22 to expand the same to the walls of the mold 21. This fluid may be grounded for convenience. An electric potential is then imposed between the mold and fluid and produces an electrostatic discharge through the surface of the now blown and formed article.

If desired the hollow thermoplastic article may be formed by introducing into parison 14a a conventional blowing medium. Upon the formation of the article, the blowing medium may be evacuated from the interior of the article and the electrically conducting fluid placed therein. Thereafter the electric potential is imposed between the mold and fluid to produce an electrostatic discharge.

Depending upon the desires of the operator and the duration of treatment the article may thus be subjected to the electrostatic discharge simultaneously with the introduction of the blowing medium. It may also be subjected to the same during or subsequent to the introduction of the blowing medium.

The fluid medium that may be used to fill the hollow article or to expand the hollow tubing to the desired size may be any fluid that is capable of conducting electricity. For example, salt water or an ionized gas may be used. This invention is not limited to any particular fluid medium except that the same be capable of conducting electricity.

The use of an electrically conducting blowhead 22 is simply illustrative of one simple way of effecting electrical contact with the electrically conducting fluid. Obviously the blowhead may be formed of insulating material and the fluid passed through or around a metallic element connected to lead 13a prior to passing through the blowhead.

The electrical potential used should be high enough to produce an electrostatic discharge. However, it may also be sufficient to produce a corona discharge adjacent the surface of the article to be treated provided there is air in the space between the article and fluid or mold. The voltage should be high enough to produce the discharge as for example, from about 1,000 to 50,000 volts. The frequency may be anywhere between 25 cycles and 30 megacycles and the current will normally be about 0.05 to 0.1 ampere and therefore the same is harmless to the operators. These conditions are conventional and well known to those skilled in the art and require no further discussion.

The second embodiment of this invention was described as used with the blow molding process disclosed in U.S. Patent No. 2,783,530 but it shoud be apparent that it is equally applicable with use on any parison which is being provided in the required condition of plasticity, for example, tubing that is preformed and subsequently reheated to the required condition of plasticity and fed to the molds in the required length. It is also applicable for use with other blow molding processes such as that producing a parison by injection molding.

The term "thermoplastic" as used herein defines any organic material which has the requisite condition of plasticity which will permit expansion and setting in predetermined form. Examples of such are polyethylene, polyamides, polyesters, vinyl polymers and copolymers, polymers of vinylidine chloride, polystyrene and polypropylene and its copolymers.

This invention is applicable to any shape of hollow thermoplastic article and it is not to be limited to the described container and tubular parison.

It can be readily seen from the foregoing that this invention makes it possible to uniformly electrostatically treat a hollow thermoplastic article of any configuration. It makes it possible to also treat either the inner or outer surface of the article without substantial modifications in existing equipment.

Another embodiment of this invention is illustrated in FIGURE 4. The hollow article 10 from any conventional process is supported by any suitable means (not shown), so that the longitudinal axis of article 10 is horizontal. The nozzle 13 is connected by lead 13a to a terminal of electrical energy source 9 as in the case of the embodiment of the invention shown in FIGURE 1, and nozzle 13 inserted in the neck of article 10 but nozzle 13 in the third embodiment is horizontally disposed and article 10 is not enclosed by article 11. In this third emobdiment a curved screen 30 is supported by any suitable means (not shown) adjacent, preferably spaced a small distance from, article 10. The screen 30 has a predetermined pattern of openings 31. Some of openings 31 are shown. The openings 31 are in the areas of screen 30 that correspond to the areas of printing to be provided on article 10. The screen 30 is electroconductive and is connected by a lead 32 to electrical energy source 9 so that an electrical potential can be provided between screen 30 and electrically conducting fluid provided in article 10 through nozzle 13.

The screen 30 shown in FIGURE 4 has a size approximately the area of the surface of article 10 which is to be printed in the pattern. The screen 30 may be the conventional stainless steel screen of mesh construction with one face containing an organic coating in selected area to close certain openings or holes so that there are openings only at certain locations that correspond to the predetermined printing pattern. This construction for the screen is well known to those skilled in the art of silk screen printing. For simplification FIGURE 4 shows a screen in which the predetermined openings are provided merely by holes in part of the plate which is refered to herein as screen 30.

In the third embodiment as illustrated in FIGURE 4 screen 30 extends almost one-half way around article 10. This is merely illustrative. With screen 30 and article 10 thus positioned source 9 is used to provide an electric potential between screen 30 and the fluid in article 10. An electric potential, e.g. of 1,000 to 10,000 volts is used. During this application of electric potential a powder (not shown), which can be electrostatically charged such as by contact with screen 30, is placed on screen 30 and the powder is physically disturbed or agitated above screen 30, e.g., by movement of a brush (not shown) back and forth across the top of screen 30. The particles of the powder are smaller than openings 31. The particles receive a charge and are attracted by the opposite charge of the fluid in article 10 so that the particles are propelled through openings 31 toward and to the outer surface of article 10. Thus article 10 receives a coating of these particles in a pattern corresponding to the pattern of openings in screen 30. The particles adhere to article 10 electrostatically.

The powder that is used may be particles of pigment, a mixture of such particles with organic resin particles, or pigmented organic resin particles. In any event these particles are fixed in their patterned position on the surface of the thermoplastic article by raising slightly the temperature of the article if it is not already heated above room temperature, by treatment of the printed surface with solvent vapor, by overspraying at least that area of the surface of article, or any other conventional means of fixing particles, such as pigment particles and resin particles, already applied to surface of a thermoplastic article. The pigmented resin may be, for example, pigmented modified phenol formaldehyde resin, sold under the name of Xerox toner and disclosed in U. S. Patent No. 2,659,670. Because screen 30 is curved there may be difficulty in brushing powder back and forth across screen 30 to bring particles in alignment with openings 31. To facilitate this, article 10 and screen 30 can be moved back and forth in unison about the longitudinal axis of article 10.

It is unnecessary to have article 10 in horizontal position. It may be in any other position including a vertical position. It is only necessary to have the particles in motion on one side of screen 30 while applying an electric potential between screen 30 and the fluid in article 10 which is on the other side of screen 30. It is apparent screen 30 may be cylindrical to enclose at least the main body portion of article 10.

Instead of curved screen 30 a flat screen may be used and in this case article 10 can be rotated about its axis while providing coordinated translatory motion to the screen with agitation of the powder generally in a vertical radial plane of the article so that zone of powder movement on the screen moves relative to the screen movement and in the opposite direction.

The embodiment described above and shown in FIGURE 1 has the advantage that the electrically conducting fluid can be already in article 10 as a result of the treating of a formed article as described in the first embodiment or as a result of the simultaneous blowing and electrostatic treating of a hollow article as described in the second embodiment. Thus the fluid in article 10 serves an additional function in such cases, namely, it provides an electrical potential at all surfaces of the article adjacent to the printing screen, which is not relying upon contact with or mechanical pressure to print on the article.

In a modification of the second embodiment as shown in FIGURE 2 wherein the article is to be electrostatically printed, the mold 21 is constructed of stainless steel screen with selected openings only being open. The screen and the fluid in the severed length of tubing 14a, which is in the mold with blowhead 22 in the lower end of the tubing and with the upper end closed by the mold, are subjected to electrical potential as described for the second embodiment during the blow molding to form the article. During this treatment the article's surfaces are treated by the discharge as the fluid pressure expands the tubing to move it to the mold surface. Thereafter powder that can be electrostatically charged is brushed, e.g., across the outer surface of the screen type of mold while providing an electrical potential between the mold and the fluid in the formed article. This will result in a formed thermoplastic article with powder adhered at least temporarily by electrostatic effect to the treated plastic surface in a pattern of printing as determined by the predetermined pattern of openings in the screen mold.

Instead of a screen mold having only a limited number of holes or openings in the mold itself, a regular screen having many holes in a uniform pattern can be used as the mold but its inner surface is coated in all non-printing areas to close openings in those areas of the screen just as in silk screening, but in the present invention this screen is used as a mold for forming with concurrent surface treatment as well as for subsequent electrostatic printing as described above.

Figure 5:
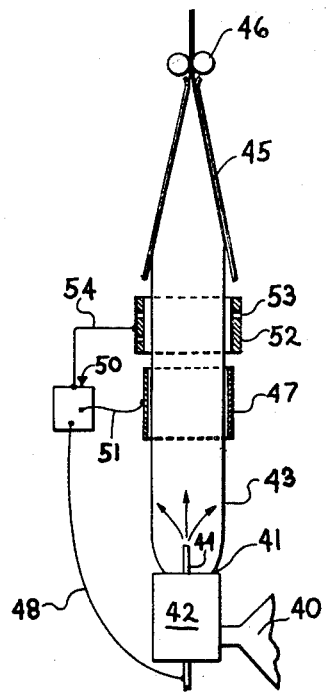
FIGURE 5 is an elevational view partly in cross section of an apparatus embodying this invention for concurrently forming thin-walled plastic tubing and electrostatically treating the same.

A further embodiment of our invention is illustrated in FIGURE 5 wherein an apparatus for producing thin-walled plastic tubing is shown. Thermoplastic material obtained from a conventional extruder 40 is extruded through an annular orifice 41 in a die head 42 in the form of tubing 43. A controlled amount of an electrically conductive fluid is introduced into the interior of tubing 43 to expand the same to its finally desired size by way of pipe 44. Pipe 44 extends through die head 42 and is connected to a suitable source of supply (not shown).

After expansion and cooling to its set form, tubing 43 is collapsed by plates 45 and thereafter passed between a pair of nip rolls 46 to completely collapse the tubing into a flattened thin-walled plastic tubing. The tubing may then be collected by suitable means (not shown).

The above described apparatus is conventional and well known to those skilled in the art. Therefore, no further illustration or description is believed necessary.

At some point between the points of extrusion and the point where the tubing passes between nip rolls 46, an electrically conductive element 47 is provided to encircle or partially encircle the tubing 43. The degree of encirclement will depend upon how much of the surface of the tubing 43 is to be treated. The element 47 should be spaced a short distance from the surface of the tubing 43.

The pipe 44 is connected by lead 48 to a terminal of electrical energy source 50. The electrically conductive element 47 is connected by lead 51 to source 50 so that an electrical potential can be provided between element 47 and the electrically conducting fluid within the tubing 43.

In the operation of the embodiment of our invention as illustrated in FIGURE 5, thermoplastic material in the form of tubing 43 is extruded. An electrically conducting fluid is introduced by way of pipe 44 into the interior of the tubing to expand the same to its desired size. While the fluid is retained in the tubing, source 50 is used to provide an electric potential, e.g., 1,000 to 50,000 volts, between element 47 and the conducting fluid. This will produce an electrostatic discharge which as previously indicated will treat the surface of the tubing to render it receptive to a surface coating. Thereafter, the tubing is collapsed and collected by conventional means.

If desired, the tubing 43 may be surrounded or partially surrounded by a curved screen 52 of a type similar to screen 30 in FIGURE 4. The screen 52 will be provided with a predetermined pattern of openings 53 which are in the areas of screen 52 that correspond to the areas of printing to be provided on the tubing 43. The screen 53 is connected by lead 54 to electrical energy source 50. The operation of this screen 52 will be in the same manner as that described with reference to FIGURE 4. Thus it is also possible to electrostatically print on tubing 43 while the same is being formed.

Thus, it can be seen from the foregoing that our invention makes it possible to electrostatically treat hollow thermoplastic articles such as containers and thin-walled tubing. It is also possible to concurrently form and electrostatically treat these articles. In addition, it is also possible to electrostatically print the surface of these articles.

It should be understood that various modifications may be made in this invention without departing from the spirit and scope of the following claims.

We claim:

1. A process for forming and treating a hollow thermoplastic article comprising the steps of forming a hollow parison of the thermoplastic material, placing said parison in an electrically conducting mold, expanding said parison to the walls of said mold by introducing a fluid under pressure into the interior of said parison, said fluid consisting of an electrically conducting fluid, and imposing an electric potential between said mold and fluid to produce an electrostatic discharge through the surface of said article to be treated.

2. A process for concurrently forming and treating a hollow thermoplastic article for the reception of a surface coating, comprising the steps of forming a hollow parison of said thermoplastic material, said parison being in a condition of plasticity to permit expansion and setting in predetermined form, placing said parison in an electrically conducting mold, expanding said parison to the walls of said mold by introducing an electrically conducting fluid under pressure into the interior of said parison, and imposing an electric potential between said mold and said fluid to produce an electrostatic discharge through the surface of said article to be treated.

3. A process for concurrently forming a thermoplastic article and treating the surface of said article for the reception of a surface coating comprising the steps of supplying a tubular body of thermoplastic material, said tubing being in a condition of plasticity to permit expansion and setting in predetermined form, transferring said tubular body to an electrically conducting mold, expanding said body in the direction of the walls of said mold by introducing an electrically conducting fluid into said tubular body, passing a high voltage electric current between said mold and fluid to produce an electrostatic discharge through the surface of said article to be treated and introducing additional fluid into said tubular body to expand the same to the walls of said mold.

4. A process for simultaneously forming a thermoplastic article and treating a surface of said article for the reception of a surface coating comprising the steps of supplying a substantially continuous tubing of thermoplastic material, said tubing being in a condition of plasticity to permit expansion and setting in predetermined form, severing a length of tubing from the tubing being supplied, transferring said severed length of tubing to a mold of electrically conducting material, expanding said length of tubing to the walls of said mold by applying an electrically conducting fluid under pressure to the interior of said severed tubing and simultaneously passing a high voltage electric current between said mold and fluid to produce an electrostatic discharge through the surface of said article to be treated.

5. A process for forming and treating thin-walled thermoplastic tubing comprising the steps of extruding thermoplastic material in the form of tubing, introducing an electrically conductive fluid into the interior of said tubing to expand the same to its finally desired size, disposing adjacent said tubing an electrically conducting member, imposing an electric potential between said member and fluid to produce an electrostatic discharge through the surface of said tubing, and thereafter collapsing and collecting said tubing.

6. An apparatus for forming thin-walled thermoplastic tubing and treating said tubing to render the same receptive to a surface coating comprising means for forming thin-walled thermoplastic tubing, an electrode member disposed adjacent said tubing, means for introducing under pressure an electrically conductive fluid into said tubing to expand said tubing to its finally desired size, and means for imposing an electric potential between said electrode and said fluid.

7. An apparatus for forming a thermoplastic article and treating a surface of said article for the reception of a surface coating comprising means for forming a hollow parison of said thermoplastic, an electrode means for encompassing said hollow parison, said electrode defining a molding cavity, means for introducing under pressure an electrically conducting fluid into said parison to expand said parison to conform to said molding cavity, and means for imposing an electric potential between said electrode and fluid.

8. A process for printing on a surface of a hollow thermoplastic article comprising the steps of introducing an electrically conductive fluid within said article, placing adjacent to said article an electrically conducting screen having small openings in a pattern that corresponds to a printing pattern and imposing an electrical potential between said screen and said fluid in said article on one side of said screen while providing electrostatically chargeable powder at the opposite side of said screen at said openings to cause said powder to pass through said openings and be deposited on said article surface.

9. A process for treating and printing on a suface of a hollow thermoplastic article comprising the steps of disposing adjacent the exterior of said article an electrically conducting element having an inner surface complementary to the outer surface of said article in at least the area to be treated, introducing an electrical potential between said element and said fluid to produce an electrical discharge through said outer surface of said article for rendering at least part of the surface receptive to a surface coating, relatively moving said article and said electrically conducting element to separate said article from said element, placing adjacent to said article an electrically conducting screen having small openings in a pattern that corresponds to a printing pattern, and imposing an electrical potential between said screen and said fluid in said article on one side of said screen while providing electrostatically chargeable powder at the opposite side of said screen at said openings to cause said powder to pass through said openings and be deposited on said article surface.

10. A process for forming, treating and printing a hollow thermoplastic article comprising the steps of forming a hollow parison of the thermoplastic material, placing said parison in an electrically conducting mold, expanding said parisons to the walls of said mold by introducing a fluid under pressure into the interior of said parison, said fluid consisting of an electrically conducting fluid, imposing an electric potential between said mold and fluid to produce an electrostatic discharge through the surface of said article to be treated to render said surface receptive to a surface coating relatively moving said article and said electrically conducting mold to separate said article from said mold, placing adjacent to said article an electrically conducting screen having small openings in a pattern that corresponds to a printing pattern, and imposing an electrical potential between said screen and said fluid in said article on one side of said screen while providing electrostatically chargeable powder at the opposite side of said screen at said openings to cause said powder to pass through said openings and be deposited on said article surface.

11. A process for treating and printing on a surface of a hollow thermoplastic article comprising the steps of disposing adjacent the exterior of said article an electrically conducting element having an inner surface complimentary to the outer surface of said article in at least the area to be treated, said element having small openings in a pattern that corresponds to a printing pattern, introducing an electrically conductive fluid within said article, imposing an electrical potential between said element and said fluid to produce an electrical discharge through said outer surface of said article for rendering at least part of the surface receptive to a surface coating, and imposing an electrical potential between said element and said fluid in said article on one side of said element while providing electrostatically chargeable powder at the opposite side of said element at said openings to cause said powder to pass through said openings and be deposited on said article surface.

12. A process for forming, treating and printing a hollow thermoplastic article comprising the steps of forming a hollow parison of the thermoplastic material, placing said parison in an electrically conducting mold, said mold having small openings in a pattern that corresponds to a printing pattern, expanding said parison to the walls of said mold by introducing a fluid under pressure into the interior of said parison, said fluid consisting of an electrically conducting fluid, imposing an electrical potential between said mold and said fluid to produce an electrostatic discharge through the surface of said parison as said parison is expanded to render the external surface receptive to a surface coating, and imposing an electrical potential between said mold and said fluid in said article while providing an electrostatically chargeable powder at said openings to cause the powder to pass through the openings and be deposited on said article surface.

References Cited by the Examiner
UNITED STATES PATENTS

| | | | |
|---|---|---|---|
| 1,784,912 | 12/30 | Scott | 117—17.5 |
| 2,876,358 | 3/59 | Root | 204—312 |
| 2,879,396 | 3/59 | McDonald | 117—93 |
| 2,894,139 | 7/59 | Magruder | 204—312 |
| 2,957,077 | 10/60 | Hay | 117—93 |
| 3,017,339 | 1/62 | Dewey. | |
| 3,021,270 | 2/62 | Tarbox et al. | 18—54.7 X |

ALEXANDER H. BRODMERKEL, *Primary Examiner.*
MICHAEL V. BRINDISI, *Examiner.*